(12) United States Patent
You et al.

(10) Patent No.: US 11,534,917 B2
(45) Date of Patent: Dec. 27, 2022

(54) METHODS, SYSTEMS, ARTICLES OF MANUFACTURE AND APPARATUS TO IMPROVE RESOURCE UTILIZATION FOR BINARY TREE STRUCTURES

(71) Applicant: Intel Corporation, Santa Clara, CA (US)

(72) Inventors: Ganmei You, Beijing (CN); Dawei Wang, Beijing (CN); Ling Liu, Beijing (CN); Xuesong Shi, Beijing (CN); Chunjie Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 16/955,388

(22) PCT Filed: Mar. 29, 2018

(86) PCT No.: PCT/CN2018/081007
§ 371 (c)(1),
(2) Date: Jun. 18, 2020

(87) PCT Pub. No.: WO2019/183868
PCT Pub. Date: Oct. 3, 2019

(65) Prior Publication Data
US 2021/0094179 A1    Apr. 1, 2021

(51) Int. Cl.
*G06F 9/46* (2006.01)
*B25J 9/16* (2006.01)
(Continued)

(52) U.S. Cl.
CPC ........ *B25J 9/1666* (2013.01); *G06F 9/30003* (2013.01); *G06F 9/4881* (2013.01);
(Continued)

(58) Field of Classification Search
CPC ....................................................... G06F 9/4881
(Continued)

(56) References Cited

U.S. PATENT DOCUMENTS

| 9,424,490 B2 * | 8/2016 | Muff ..................... G06V 10/764 |
| 2012/0131595 A1 * | 5/2012 | Kim ...................... G06F 9/5083 |
| | | 718/105 |

(Continued)

FOREIGN PATENT DOCUMENTS

| CN | 104463940 | 3/2015 |
| WO | 2019/183868 | 10/2019 |

OTHER PUBLICATIONS

Lauterbach, C., et al., "gProximity: Hierarchical GPU-Based Operations for Collision and Distance Queries," Computer Graphics Forum: Journal of the European Association for Computer Graphics, vol. 29, No. 2, Jun. 7, 2010, pp. 119-428.*

(Continued)

*Primary Examiner* — Mehran Kamran
(74) *Attorney, Agent, or Firm* — Hanley, Flight & Zimmerman, LLC (57) ABSTRACT

Methods, apparatus, systems and articles of manufacture are disclosed to improve resource utilization for binary tree structures. An example apparatus to improve resource utilization for field programmable gate array (FPGA) resources includes a computation determiner to identify a computation capability value associated with the FPGA resources, a k-ary tree builder to build a first k-ary tree having a number of k-ary nodes equal to the computation capability value, and an FPGA memory controller to initiate collision computation by transferring the first k-ary tree to a first memory of the FPGA resources.

22 Claims, 8 Drawing Sheets

(51) Int. Cl.
*G06F 9/30* (2018.01)
*G06V 10/94* (2022.01)
*G06F 9/48* (2006.01)
*G06F 9/50* (2006.01)

(52) U.S. Cl.
CPC .......... *G06F 9/5044* (2013.01); *G06F 9/5066* (2013.01); *G06V 10/94* (2022.01)

(58) Field of Classification Search
USPC ........................................................ 718/104
See application file for complete search history.

(56) References Cited

U.S. PATENT DOCUMENTS

| | | | | |
|---|---|---|---|---|
| 2012/0166728 | A1* | 6/2012 | Garg | G06F 9/5016 |
| | | | | 711/120 |
| 2013/0055279 | A1* | 2/2013 | Sistare | G06F 9/50 |
| | | | | 718/104 |
| 2013/0231855 | A1* | 9/2013 | Mcaree | G08G 99/00 |
| | | | | 701/301 |
| 2014/0347355 | A1* | 11/2014 | Yoon | G06T 15/06 |
| | | | | 345/419 |
| 2015/0262064 | A1* | 9/2015 | Burger | G06N 5/022 |
| | | | | 706/46 |
| 2017/0161944 | A1* | 6/2017 | Deshwal | G06T 17/005 |
| 2017/0262567 | A1* | 9/2017 | Vassiliev | H03K 19/17704 |
| 2018/0182158 | A1* | 6/2018 | Karras | G06T 15/06 |
| 2018/0205552 | A1* | 7/2018 | Struttmann | H04L 9/0637 |
| 2021/0168062 | A1* | 6/2021 | Horrein | H04L 47/2441 |
| 2021/0178591 | A1* | 6/2021 | Floyd-Jones | B25J 9/1666 |
| 2021/0263501 | A1* | 8/2021 | Wang | B60W 50/06 |

OTHER PUBLICATIONS

Zhang, Zhaorui, et al., "FPGA-Based High-Performance Collision Detection: An Enabling Technique for Image-Guided Robotic Surgery," Frontiers in Robotics and AI, vol. 3, Aug. 31, 2016, 14 pages.*

International Searching Authority, "International Search Report and Written Opinion," mailed in connection with International Patent Application No. PCT/CN2018/081007, dated Dec. 29, 2018, 9 pages.

International Searching Authority, "International Preliminary Report on Patentability," mailed in connection with International Patent Application No. PCT/CN2018/081007, dated Sep. 29, 2020, 4 pages.

* cited by examiner

METHODS, SYSTEMS, ARTICLES OF MANUFACTURE AND APPARATUS TO IMPROVE RESOURCE UTILIZATION FOR BINARY TREE STRUCTURES

CROSS-REFERENCE TO RELATED APPLICATION

This patent arises from a 371 Nationalization of International Patent Application Serial No. PCT/CN2018/081007, which is entitled "METHODS, SYSTEMS, ARTICLES OF MANUFACTURE AND APPARATUS TO IMPROVE RESOURCE UTILIZATION FOR BINARY TREE STRUCTURES," and which was filed on Mar. 29, 2018, the subject matter of which is expressly incorporated herein by reference in its entirety.

FIELD OF THE DISCLOSURE

This disclosure relates generally to binary tree structures, and, more particularly, to methods, systems, articles of manufacture and apparatus to improve resource utilization for binary tree structures.

BACKGROUND

In recent years, autonomous devices have performed collision checking tasks to avoid obstacles when traversing regions of interest. Collision checking tasks check the intersection between two given surfaces or volumes that may be represented by shapes, such as triangles, boxes, etc. The collision checking of the shapes is computationally intensive and to prevent unwanted collision of the autonomous devices with obstacles, processing speed must be sufficient.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Autonomous device navigation requires collision checking tasks to be performed fast enough so that devices (e.g., vehicles, robots, etc.) do not collide with obstacles while travelling at a particular speed. As the speed of such devices increases, so increases a required rate of collision checking tasks to facilitate safe device propagation. In some examples, collision checking processing is referred to as "real time" collision checking when surfaces can be compared fast enough to detect potential collisions, and apply corrective controls to avoid such potential collisions.

To achieve improved performance with collision checking tasks, field-programmable gate arrays (FPGAs) are used to process data associated with surfaces. Bounding Volume Hierarchies (BVHs) are used to represent such surfaces. A BVH is a tree structure on a set of geometric objects, in which geometric objects are wrapped in bounding volumes that form leaf nodes of the tree. Any number of BVHs are generated by input devices of an autonomous device (e.g., a quad-copter, a drone, a robot, a car, etc.), such as Light Detection and Ranging (LiDAR) systems, global positioning satellite (GPS) systems, acoustic ranging systems, etc. In some examples, BVH trees are created using the Flexible-Collision-Library (FCL) employed by such systems. In some examples, BVHs are stored in a memory and/or database for future processing to identify potential collision scenarios and/or route planning and control of the autonomous device. The process of collision checking includes traversing and/or otherwise searching trees to determine whether there is a collision conflict between nodes of the trees.

Figure 1:
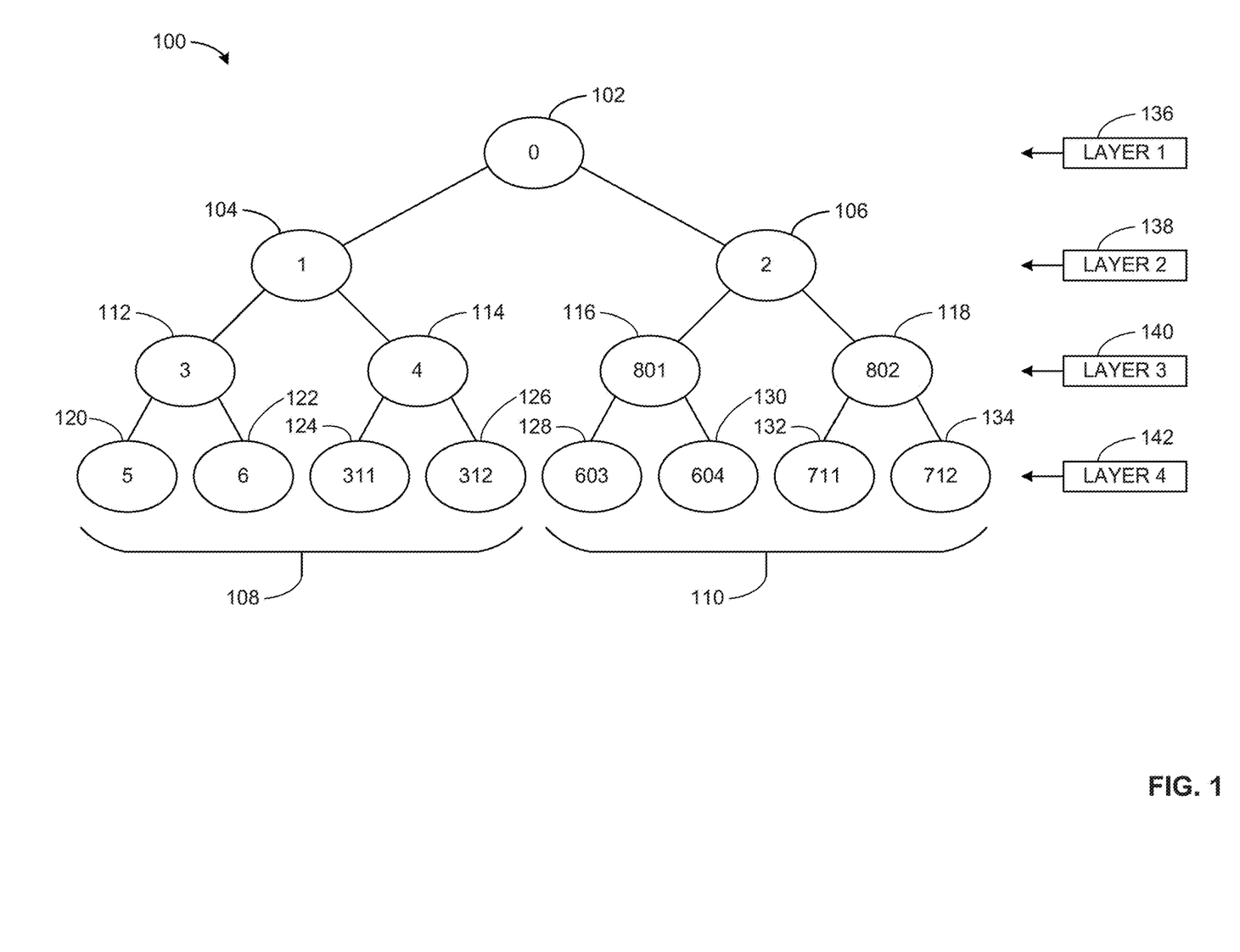
FIG. 1 is a schematic illustration of a binary bounding volume hierarchy (BVH) tree constructed in accordance with the teachings of this disclosure.

FIG. 1 illustrates an example binary BVH tree 100 having a root node 102 (node "0") indicative of a region of interest in which surface collisions may occur. The example BVH tree 100 of FIG. 1 may be retrieved from a memory and/or database that stores any number of BVHs related to a region of interest in which the autonomous device is located. In the illustrated example of FIG. 1, the region of interest includes a first object node 104 (node "1") and a second object node 106 (node "2") indicative of a first surface and a second surface, respectively, within the region of interest. Stated differently, the example binary BVH tree 100 of FIG. 1 identifies a first subtree 108 having descendant nodes and a second subtree 110 having descendant nodes, in which the descendant nodes contain spatial information used during one or more collision checking operations that determine whether the first and second surfaces collide.

In the illustrated example of FIG. 1, node "1" (104) includes descendant node "3" (112), descendant node "4" (114), descendant node "5" (120), descendant node "6" (122), descendant node "311" (124) and descendant node "312" (126); example node "2" (106) includes descendant node "801" (116), descendant node "802" (118), descendant node "603" (128) and descendant node "604" (130), descendant node "711" (132) and descendant node "712" (134); example node "3" (112) includes descendant node "5" (120) and descendant node "6" (122); example node "4" includes descendant node "311" (124) and descendant node "312" (126); example node "801" (116) includes descendant node "603" (128) and descendant node "604" (130); and example node "802" (118) includes descendant node "711" (132) and descendant node "712" (134). In the illustrated example of FIG. 1, the BVH tree 100 includes four separate layers (rows), in which a first layer (136) includes the root node "0" 102, a second layer (138) includes node "1" (104) and node "2" (106), a third layer (140) includes node "3" (112), node "4" (114), node "801" (116) and node "802" (118), and a fourth layer (142) includes node "5" (120), node "6" (122), node "311" (124), node "312" (126), node "603" (128), node "604" (130), node "711" (132) and node "712" (134). While the illustrated example of FIG. 1 includes four layers, examples disclosed herein are not limited thereto.

Starting with the root node "0" (102), descendant node "1" (104) and descendant node "2" (106) are referred to herein as "brothers." Similarly, descendant nodes of node "1" (104) include brothers as node "3" (112) and node "4" (114), and so on. Typical application of BVH tree structures with FPGA resources acquire and load nodes as pairs of brothers to ensure continuous address space.

Figure 2:
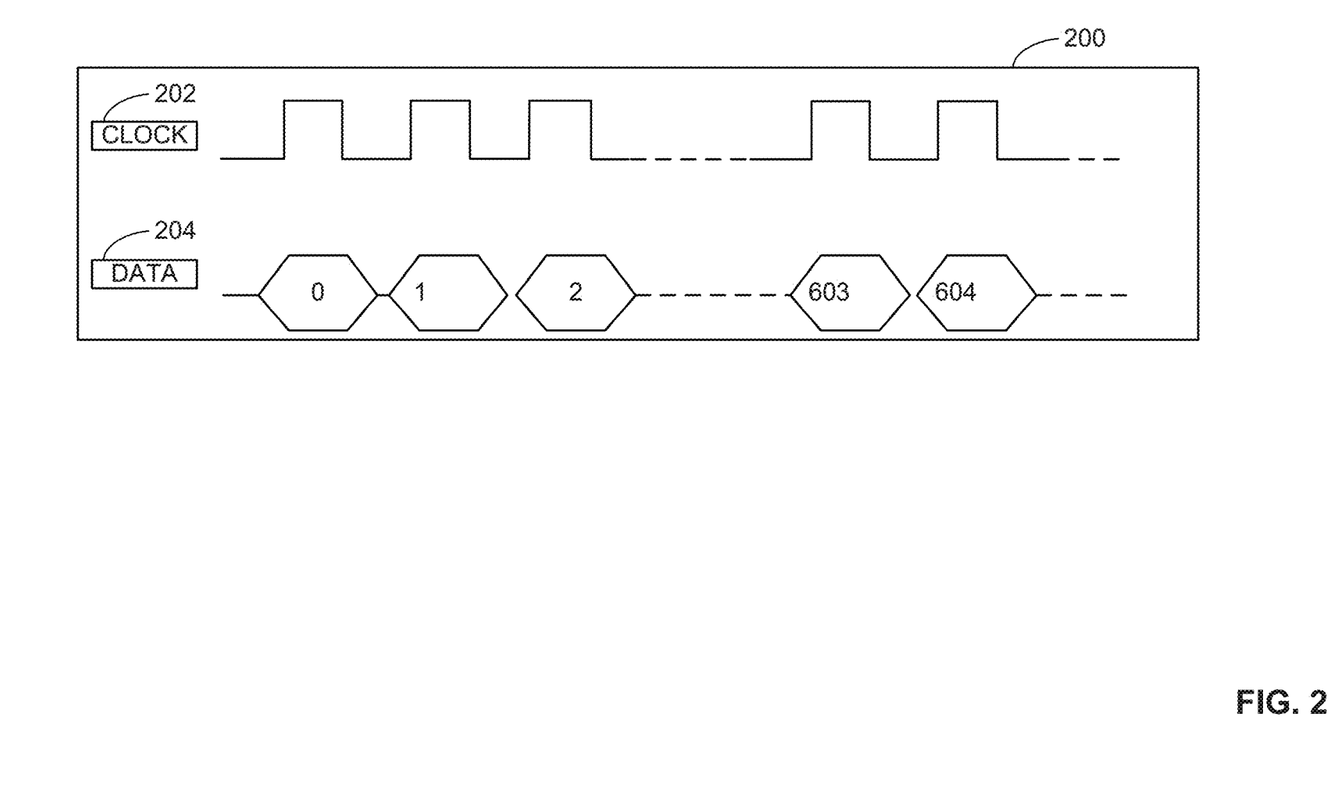
FIG. 2 is a schematic illustration of an address space constructed in accordance with the teachings of this disclosure.

FIG. 2 illustrates an example address space 200 on double data rate (DDR) random-access memory (RAM) (e.g., DDR synchronous dynamic RAM, or DDR SDRAM). In the illustrated example of FIG. 2, the address space 200 includes a clock signal 202 synchronized with a data signal 204 indicative of node data from the example BVH tree 100 of FIG. 1. Data signal 204 values of "0," "1," "2," and so on correspond to relative address space on the DDR memory of the FPGA resources.

One of the performance bottlenecks associated with traditional techniques of using BVH trees with FPGA resources is that a memory bandwidth of the FPGA memory cannot match a peak performance of available computing units of the FPGA resources. For example, because FPGA computing units fetch brothers of BVH data to maintain a space-continuous address orientation, only two of the FPGA computing units are utilized at one time, thereby leaving other computing units idle and/or otherwise unutilized. In other words, such traditional techniques to load the FPGA resources with BVH data utilize an FPGA memory bandwidth having a burst of two despite the fact that the FPGA resources may have many more available computing units. Typically, a central processing unit (CPU) communicatively and/or otherwise operatively connected to the FPGA resources will utilize OpenCL to transfer data from the CPU to the FPGA to DDR memory on the FPGA resources. Additionally, the DDR memory stores the data to be transferred to FPGA on-chip memory associated with the number of available computing units (e.g., to facilitate overlap or collision computations).

Examples disclosed herein improve a speed at which BVH data is loaded to FPGA resources by, in part, modifying and/or otherwise generating BVH tree information into a breadth-wide format/order based on available computing units of the FPGA resources. A k-ary BVH tree is generated by examples disclosed herein based on the parallel computing capability of the FPGA resources to facilitate loading the k-ary BVH tree from a CPU to DDR memory. As such, examples disclosed herein enable transfer from the DDR memory to FPGA on-chip memory during tree traversal by the FPGA resources in parallel with all available FPGA computing units, thereby avoiding idling of any one of the FPGA computing units. Additionally, examples disclosed herein reduce computational effort on behalf of the FPGA resources by removing BVH nodes between an ancestor node and corresponding descendant nodes, as described in further detail below.

Figure 3:
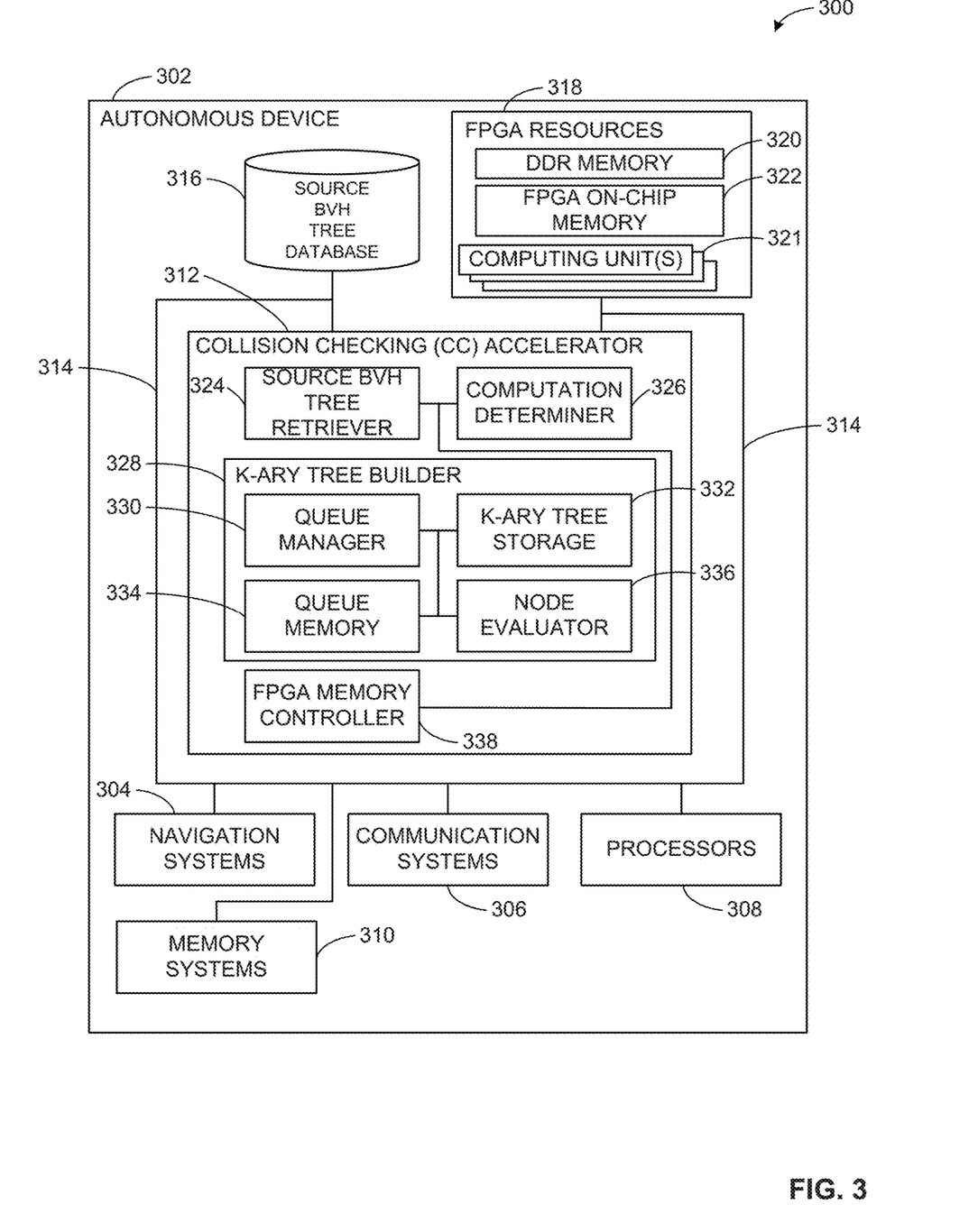
FIG. 3 is a schematic illustration of an example autonomous device environment to improve resource utilization for binary tree structures constructed in accordance with the teachings of this disclosure.

FIG. 3 is a schematic illustration of an example autonomous device environment 300. In the illustrated example of FIG. 3, the autonomous device environment 300 includes an autonomous device 302, such as a robot, an automobile, a truck, a quadcopter, etc. The example autonomous device 302 of FIG. 3 includes example navigation systems 304, example communication systems 306, example processors 308 and example memory systems 310. In operation, the example navigation systems 304 acquire location information (e.g., GPS information), acquire spatial information (e.g., LiDAR scans, altitude, proximity, etc.) and/or control propagation elements (e.g., drive motors, propellers, steering servos, etc.) associated with the example autonomous device 302. The example communication systems 306 facilitate communication between the example autonomous device 302 and one or more other entities, such as other autonomous devices and/or telemetry commands from operators of the autonomous device 302. The example processors 308 facilitate computing resources for the example autonomous device 302, which may aid in navigation and/or communication operations. The example memory systems 310 may include one or more memory storage devices to facilitate storage resources for the example autonomous device 302. Storage resources may include, but are not limited to route planning information, topology/map information, mission objective information, etc.

In the illustrated example of FIG. 3, the autonomous device 302 includes an example collision checking (CC) accelerator 312 communicatively connected to the example navigation systems 304, the example communication systems 306, the example processors 308 and the example memory systems 310 via a bus 314. The example CC accelerator 312 is also communicatively connected to an example source BVH tree database 316 and example FPGA resources 318. In some examples, the CC accelerator 312 operates on a "CPU side" separate from the example FPGA resources 318. In some examples, the BVH tree database 316 is a part of the example memory systems 310. The example FPGA resources of FIG. 3 include example DDR memory 320 and example FPGA on-chip memory 322. The example CC accelerator 312 includes an example source BVH tree retriever 324, an example computation determiner 326, an example k-ary tree builder 328, an example queue manager 330, an example k-ary tree storage 332, an example queue memory 334, an example node evaluator 336, and an example FPGA memory controller 338.

In operation, the example source BVH tree retriever 324 retrieves a binary BVH tree that is associated with potentially intersecting surfaces, in which the BVH tree has any number of BVH nodes within different layers of the BVH tree. In particular, the BVH nodes include spatial information associated with at least two different surfaces that may have the potential to intersect and/or otherwise collide with each other. As described above, any number of BVH trees (e.g., the example BVH tree 100 of FIG. 1) may be acquired and/or otherwise generated by an autonomous device based on retrieved and/or received inputs relating to its spatial conditions (e.g., LiDAR inputs).

BVH trees may be stored in the example source BVH tree database 316 and retrieved by the example BVH tree retriever 324. The example computation determiner 326 identifies a computation capability (e.g., a parallel computation capability indicative of a maximum number of computing units 321 that can operate at the same time on data provided to FPGA on-chip memory 322) of the example FPGA resources 318. Generally speaking, FPGA resources may include any number of computing units 321 that work in parallel in a pipeline architecture, thereby providing improved computing speed for certain types of applications. However, to take advantage of such computational speed improvements requires that as many of the available computing units 321 are active during each clock cycle.

In the event one or more of the computing units of the example FPGA resources 318 do not have input data, then such computing units remain idle and do not contribute to the parallel architecture of the FPGA. In some examples, the computation determiner 326 tests the example FPGA resources 318 by transferring a node (n=1) to elicit a resource usage report. If the example computation determiner 326 does not detect an overload condition after reviewing the resource usage report, an additional node (n=n+1) may be sent to the example FPGA resources 318 to elicit another resource usage report. The example computation determiner 326 may iterate node transfers with increasing quantities of transferred nodes until the resource usage report identifies an overload condition and, in response to detecting the overload, identify a computational capability value (k) as one less than the highest number of attempted nodes (e.g., k=n−1).

Figure 4:
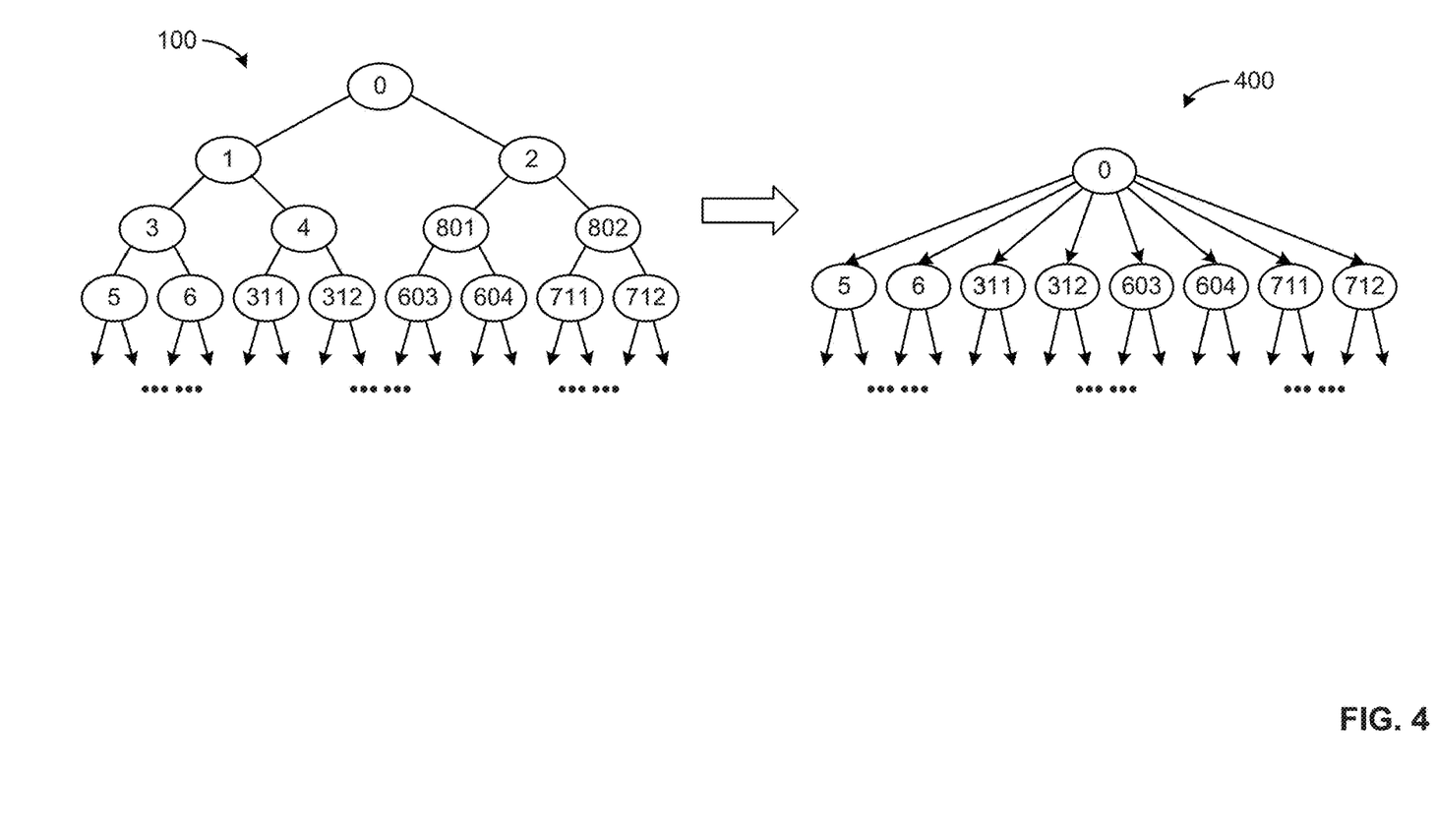
FIG. 4 is an example k-ary BVH tree constructed in accordance with the teachings of this disclosure.

Based on the computational capability value (k) determined by the example computation determiner 326, the example k-ary tree builder 328 builds at least one k-ary tree (e.g., a first k-ary tree associated with the target BVH tree). As used herein, a k-ary tree is a tree data structure having a representative root node and a single descendant layer containing a quantity of k nodes. FIG. 4 illustrates an example k-ary BVH tree 400 that was generated by the example k-ary tree builder 328. In the illustrated example of FIG. 4, the BVH tree 100 of FIG. 1 is shown on the left, and the example computation determiner 326 identified a computational capability value (k) of eight (8). Based on the example computational capability value of eight (8), the example k-ary tree builder 328 generated an 8-ary BVH tree 400. Additionally, node "1", node "2", node "3", node "4", node "801" and node "802" have been identified as intermediate nodes and have been removed from processing burden(s) by the example computational resources 321.

To generate the example k-ary BVH tree, such as the example 8-ary BVH tree 400 of FIG. 4, the example queue manager 330 pushes a root node of the retrieved binary BVH tree (e.g., the example binary BVH tree 100 of FIG. 1) to the example queue memory 334. For example, the example queue manager 330 pushes node "0" (102) of FIG. 1 to the example queue memory 334. The example k-ary tree builder 328 allocates memory for the k-ary tree in the example k-ary tree storage 332, and the example queue manager 330 determines whether the example queue memory 334 is empty. Stated differently, the example queue manager 330 verifies that the entire BVH binary tree of interest has been traversed (all nodes have been evaluated for addition to the k-ary tree). However, during a first iteration the example queue memory 334 will not be empty because it contains the root node of the binary BVH tree of interest.

The example queue manager 330 pops a node (p) (or multiple nodes) from the example queue memory 334 and traverses that popped node (or nodes in which a layer has more than one node) in breadth order. As used herein, breadth order refers to a traversing a tree on a level-by-level basis, which is distinguished from, for example, a depth order that traverses a tree by visiting all descendants before moving to alternate brothers of a level. To illustrate, because the root node "0" was just popped out of the example queue memory 334, the queue manager 330 traverses the binary BVH tree in breadth order to discover brother node "1" (104) and brother node "2" (106). As described above, these brother nodes are located in layer 2 (138) of the example binary BVH tree 100 of FIG. 1. These nodes are pushed into the example queue memory 334 by the example queue manager 330.

The example node evaluator 336 determines whether the traversed nodes include a number of descendants equal to the identified computational capability value (k). If not, then any attempt to apply FPGA resources to the binary BVH tree of interest will not take full advantage of the available computing units of the example FPGA resources 318. Because the descendant count does not yet equal the computational capability value (k), which is assumed to be eight (8) for this example, and these descendant nodes still have their descendants, the example queue manager 330 bypasses and/or otherwise ignores those nodes. In some examples, when the descendant count is less than the value of the computational capability value (k), and these descendant nodes do not have further descendants (e.g., leaves), then these remaining nodes are not ignored, but are cloned. In some examples, descendant nodes that do not satisfy the quantity associated with the computational capability value (k) and are not leaves are referred to and/or otherwise designated as intermediate nodes. The example queue manager 330 pops those intermediate nodes from the example queue memory 334 and traverses from that layer in breadth order to push any descendants that reside in the next (e.g., lower) layer. Stated differently, the example queue manager 330 prevents processing by the example FPGA resources 318 of BVH nodes designated as intermediate, thereby reducing a computational burden imposed on the example FPGA resources 318. Continuing with the example binary BVH tree 100 of FIG. 1, the example queue manager 330 pushes descendant node "3" (112), descendant node "4" (114), descendant node "801" (116) and descendant node "802" (118) to the example queue memory 334. The example node evaluator 336 determines whether the quantity of pushed descendant nodes is equal to the computational capability value (k), which is eight (8) in this example (e.g., the example FPGA resources 318 include eight (8) computing units that are capable of operating in a pipelined parallel manner).

Again, because the example node evaluator 336 determines that only four (4) descendant nodes were traversed, thereby not satisfying the test for k=8, the example queue manager 330 bypasses and/or otherwise ignores those nodes (intermediate nodes). The example queue manager 330 pops those intermediate nodes from the example queue memory 334 and traverses from that layer in breadth order to push any descendants that reside in the next lower layer. Continuing with the example binary BVH tree 100 of FIG. 1, the example queue manager 330 pushes descendant node "5" (120), descendant node "6" (122), descendant node "311" (124), descendant node "312" (126), descendant node "603" (128), descendant node "604" (130), descendant node "711" (132) and descendant node "712" (134) to the example queue memory 334. The example node evaluator 336 determines whether the quantity of pushed descendant nodes is equal to the computational capability value (k). Unlike previous iterations described above, the quantity of pushed descendant nodes is now equal to eight (8), and the example k-ary tree builder 328 copies and/or otherwise clones the root node "0" (102) and the recently pushed descendant nodes to the example k-ary tree storage 332.

Figure 5:
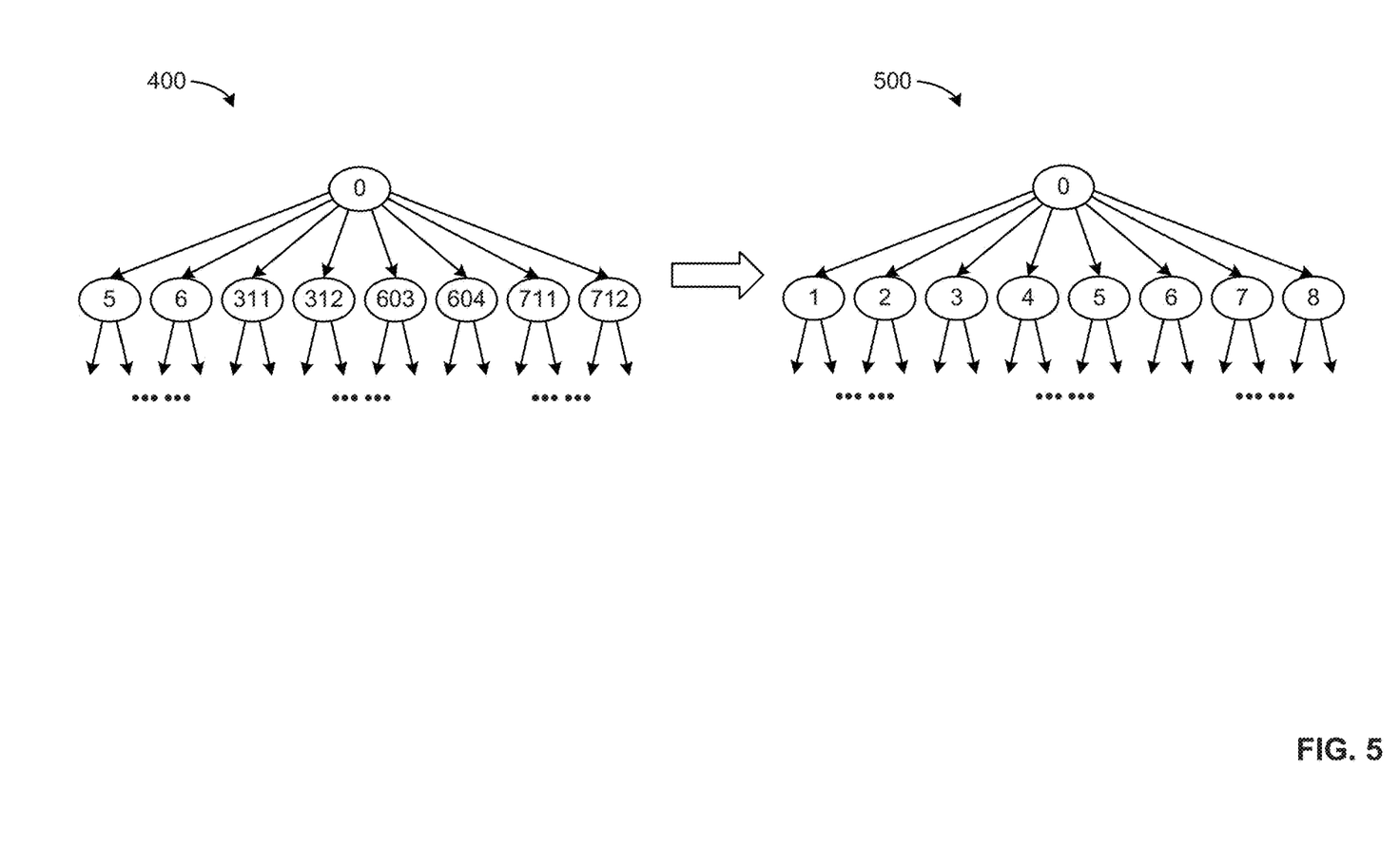
FIG. 5 is an example map of k-ary tree labels performed by the example autonomous device environment of FIG. 3.

In some examples, the example k-ary tree builder 328 maps the nodes of the k-ary tree with labels associated with corresponding computing units of the example FPGA resources 318, as shown in FIG. 5. In some examples, the k-ary tree builder 328 designates the number of descendant nodes that equal the computational capability value (k) as k-ary nodes to be added to a k-ary tree. The example queue manager 330 pops the copied nodes from the example queue memory 334, thereby rendering the queue memory 334 empty.

While the above example illustrates an example binary BVH tree having a size as shown in the illustrated example of FIG. 1, examples disclosed herein are not limited thereto.

In the event an example binary BVH tree is larger, the example node evaluator 336 performs an analysis on the tree to determine whether additional non-leaf descendants exist. If so, then the example queue manager 330 pushes descendant node(s) of a next (lower) level to the example queue memory 334, and the example above repeats to generate another k-ary tree to be loaded to the example FPGA resources 318. On the other hand, in the event the example node evaluator 336 determines that there are no further descendant nodes, thereby indicating that the example binary BVH tree 100 has been fully traversed, the example queue manager 330 determines that the queue memory 334 is empty and control advances to the example FPGA memory controller 338.

The example FPGA memory controller 338 transfers one or more k-ary trees from the example k-ary tree storage 332 to the example DDR memory 320 of the FPGA resources 318. In some examples, the transferring of the one or more k-ary trees to the example DDR memory 320 initializes a collision computation operation(s) by the example FPGA resources 318. Generally speaking, FPGA resources include at least two separate memories during computational tasks. In some examples, the FPGA on-chip memory 322 is relatively small when compared to the DDR memory 320, and cannot store all k-ary tree data that may be generated by the example CC accelerator 312. Instead, the example DDR memory 320 includes a memory size sufficient to store all of the k-ary tree data associated with the binary BVH tree and generated by the CC accelerator 312. The example FPGA memory controller 338 provides and/or otherwise transfers one k-ary tree as a block in a manner that matches the computing capability of the FPGA resources 318 (e.g., a block of eight (8) nodes). With the k-ary block data, the example FPGA resources 318 compute overlap conditions to identify whether collision may occur between surfaces represented by the example binary BVH tree in a more efficient manner because, in part, intermediate nodes (e.g., node "1" (104), node "2" (106), node "3" (112), node "4" (114), node "801" (116) and node "802" (118)) are not computed and/or otherwise processed by the FPGA resources 318. Additionally, collision checking tasks are improved (faster) because the block size of k-ary data processed by respective computing units of the FPGA resources 318 are fully utilized rather than one or more computing units remaining idle.

While an example manner of implementing the example autonomous device environment 300 of FIG. 3 is illustrated in FIGS. 1-5, one or more of the elements, processes and/or devices illustrated in FIG. 3 may be combined, divided, re-arranged, omitted, eliminated and/or implemented in any other way. Further, the example autonomous device 302, the example navigation systems 304, the example communication systems 306, the example processors 308, the example memory systems 310, the example CC accelerator 312, the example source BVH tree retriever 324, the example computation determiner 326, the example k-ary tree builder 328, the example queue manager 330, the example node evaluator 336, the example FPGA memory controller 338, the example FPGA resources 318 and/or, more generally, the example autonomous device environment 300 of FIG. 3 may be implemented by hardware, software, firmware and/or any combination of hardware, software and/or firmware. Thus, for example, any of the example autonomous device 302, the example navigation systems 304, the example communication systems 306, the example processors 308, the example memory systems 310, the example CC accelerator 312, the example source BVH tree retriever 324, the example computation determiner 326, the example k-ary tree builder 328, the example queue manager 330, the example node evaluator 336, the example FPGA memory controller 338, the example FPGA resources 318 and/or, more generally, the example autonomous device environment 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example autonomous device 302, the example navigation systems 304, the example communication systems 306, the example processors 308, the example memory systems 310, the example CC accelerator 312, the example source BVH tree retriever 324, the example computation determiner 326, the example k-ary tree builder 328, the example queue manager 330, the example node evaluator 336, the example FPGA memory controller 338, the example FPGA resources 318 and/or, more generally, the example autonomous device environment 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example autonomous device environment 300 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
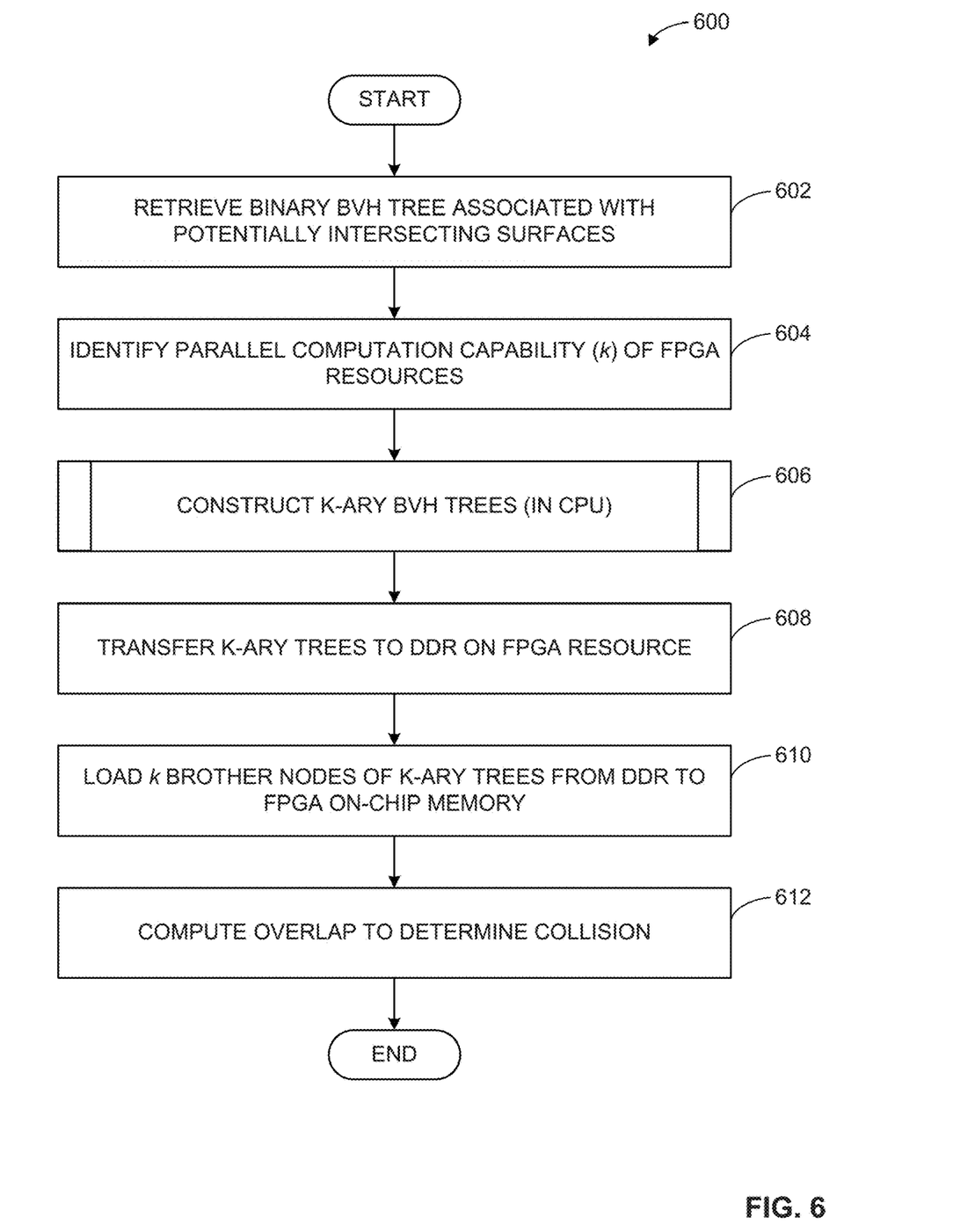
FIGS. 6-7 are flowcharts representative of machine readable instructions which may be executed to implement the example autonomous device environment of FIG. 3.
Figure 7:
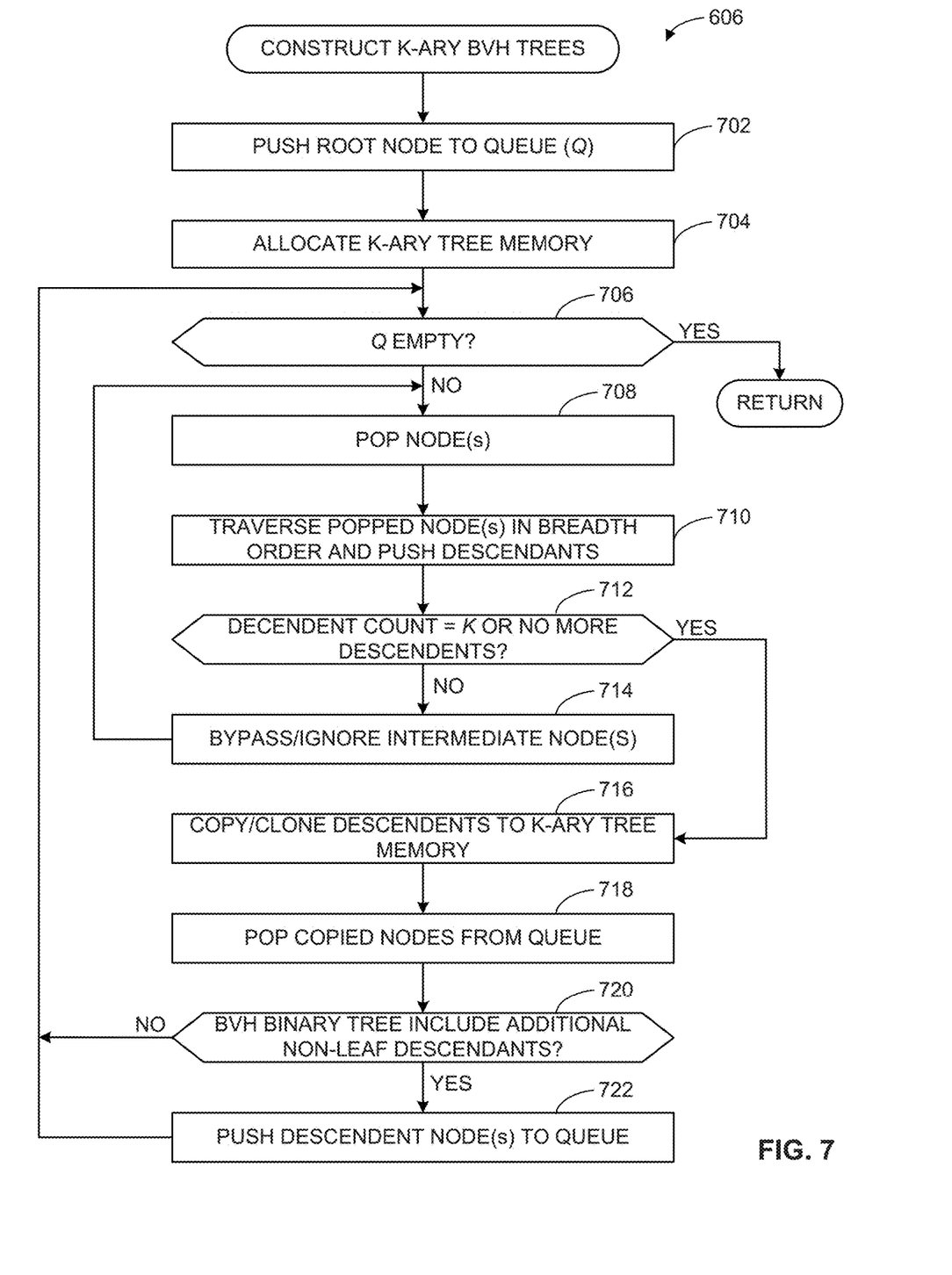

Flowcharts representative of example hardware logic or machine readable instructions for implementing the autonomous device environment 300 of FIG. 3 are shown in FIGS. 6-7. The machine readable instructions may be a program or portion of a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6-7, many other methods of implementing the example autonomous device environment 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program 600 of FIG. 6 includes block 602, in which the example source BVH tree retriever 324 retrieves binary BVH trees associated with potentially intersecting surfaces. The example computation determiner 326 identifies a parallel computation capability of the example FPGA resources 318 (e.g., determines a value k indicative of a number of available computing units of the FPGA resources) (block 604). As described above, FPGA resources may include any number of computing units that work in parallel in a pipeline architecture, thereby providing improved computing speed for certain types of applications. Because examples disclosed herein tailor spatial data from the retrieved binary BVH tree based on a number of available FPGA computing units, parallel processing efficiency during FPGA collision checking is improved.

Based on the computational capability value (k), the example k-ary tree builder 328 builds at least one k-ary tree (block 606). As described above and in further detail below, one or more k-ary trees are generated in a manner that facilitates block node transfers from example DDR memory 320 of the example FPGA resources 318 to respective FPGA on-chip memory 322. The example FPGA memory controller 338 transfers the one or more generated k-ary trees to the example DDR memory 320 (block 608), and causes the DDR memory 320 to load a quantity of k brother nodes of each k-ary tree to the FPGA on-chip memory 322 as a k-sized burst (block 610). Iterations of k-sized bursts occur for each k-ary tree generated by the example CC accelerator 312 to allow the example FPGA resources 318 to perform collision checking (block 612). In particular, the example CC accelerator 312 facilitates the performance of (a) collision checking in a manner that fully utilizes all available FPGA computing units and (b) bypassing intermediate nodes/layers of the original binary BVH tree that would otherwise be processed by the FPGA resources 318 via traditional techniques.

FIG. 7 illustrates additional detail associated with constructing one or more k-ary BVH trees of block 606. In the illustrated example of FIG. 7, the queue manager 330 pushes a root node of the target BVH tree (e.g., the example root node "0" (102) of the example BVH tree 100 of FIG. 1) to the example queue memory 334 (block 702). As described above and in further detail below, examples disclosed herein evaluate the queue memory 334 to determine if it is empty, which serves as an indication that all nodes of the target BVH tree have been considered and/or otherwise traversed. The example k-ary tree builder 328 allocates a k-ary tree memory (e.g., a memory allocation (malloc) to the example k-ary tree storage 332) to serve as a storage location for the one or more k-ary trees generated by the example CC accelerator 312 (block 704). In some examples, the k-ary tree builder 328 identifies a target memory width for the example k-ary tree storage 332 based on the previously calculated value (k) indicative of the number of available computing units of the FPGA resources 318.

The example queue manager 330 determines whether the example queue memory 334 is empty (block 706). If so, the example program 606 returns to block 608 of FIG. 6 because one or more k-ary trees have been generated and all nodes/layers of the target BVH tree have been traversed. However, during a first iteration through the example program 606 the example queue memory 334 will not be empty because it contains the root node of the target BVH tree (e.g., root node "0" 102) (block 706). The example queue manager 330 pops the node(s) in the example queue memory 334 (block 708), and traverses the target BVH tree in breadth-first-order to locate and push one or more descendant nodes to the example queue memory 334 (block 710). The example node evaluator 336 calculates a number of descendant nodes pushed into the example queue memory 334 against a threshold value k (block 712), which represents the number of available computing units associated with the example FPGA resources 318. If the example node evaluator 336 determines that the threshold is not satisfied (block 712), then the example queue manager 330 bypasses/ignores the previously pushed nodes of the example queue memory 334 (block 714), and control returns to block 708 to allow further propagation of the target BVH tree.

On the other hand, in the event the example node evaluator 336 determines that the threshold is satisfied (block 712), then the example k-ary tree builder 328 copies and/or otherwise clones the descendant nodes from the example queue memory 334 to the example k-ary tree storage 332 as a k-ary tree (block 716). Stated differently, because the number of descendant nodes satisfies the threshold value (k), the k-ary tree is of an appropriate size to fully utilize all available computing units of the example FPGA resources 318. The example queue manager 330 pops the descendant nodes from the example queue memory 334 (block 718), which causes the example queue memory 334 to be empty. However, the possibility exists that the target BVH binary tree includes additional non-leaf descendants, as determined by the example node evaluator 336 (block 720). If so, then the example queue manager 330 pushes identified descendant node(s) to the example queue memory 334 (block 722). Control then returns to block 706 where the example queue manager 330 determines whether the example queue memory 334 is empty. However, in this example because newly identified and/or otherwise discovered descendant nodes reside in the example queue memory 334, control advances to block 708 in an effort to generate one or more additional k-ary trees. On the other hand, in the event the target BVH tree does not include additional non-leaf descendants (block 720), then block 722 is skipped and control returns to block 706. In this example, because the queue is empty, the example program 606 returns to block 608 of FIG. 6, which is an indication that the target BVH tree has been fully traversed.

Figure 8:
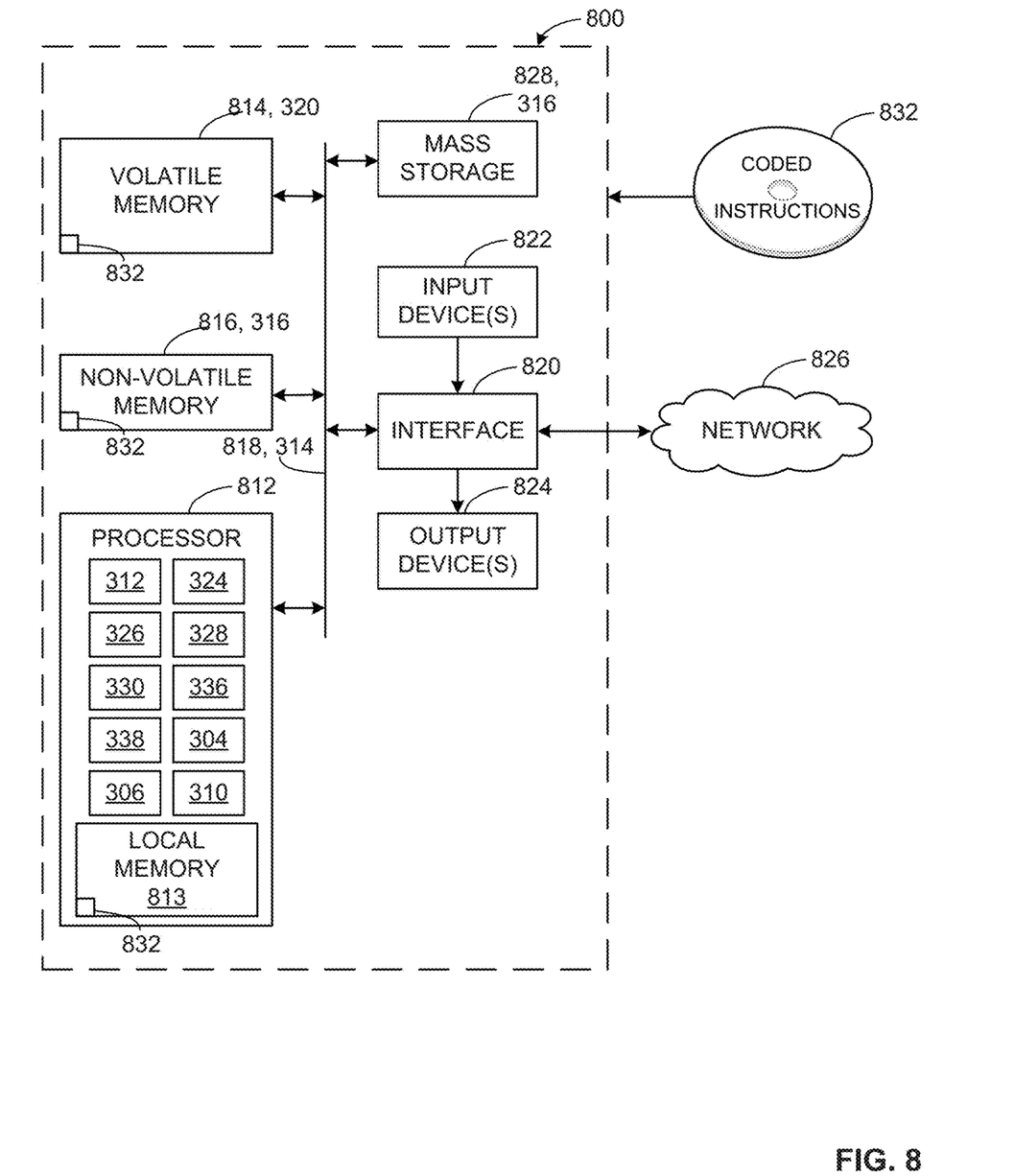
FIG. 8 is a block diagram of an example processing platform structured to execute the instructions of FIGS. 6-7 to implement the example autonomous device environment of FIG. 3.

FIG. 8 is a block diagram of an example processor platform 800 structured to execute the instructions of FIGS. 6 and 7 to implement the example autonomous device environment 300 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example source BVH tree retriever 324, the example computation determiner 326, the example queue manager 330, the example node evaluator 336, the example k-ary tree builder 328, the example FPGA memory controller 338, and the example CC accelerator 312.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6-7 may be stored in the mass storage device 828, in the volatile memory 814, in the non-volatile memory 816, and/or on a removable non-transitory computer readable storage medium such as a CD or DVD.

From the foregoing, it will be appreciated that example methods, systems, apparatus and articles of manufacture have been disclosed that improve resource utilization of FPGA resources. In particular, examples disclosed herein prevent computational waste observed with known techniques of transferring tree node data to FPGA resources that result in one or more computing units remaining idle during the transfer process. Instead, examples disclosed herein facilitate k-ary tree generation in a manner that is tailored to the computing capability of the target FPGA resources. Such tailored k-ary tree generation further facilitates loading of k-ary nodes in block fashion that matches a memory bandwidth of the FPGA resources. Additionally, while known techniques of traversing binary BVH trees causes FPGA resources to traverse intermediate nodes of the tree, examples disclosed herein bypass and/or otherwise prevent FPGA resources from traversing and/or otherwise processing intermediate nodes, thereby improving computational efficiency and speed of the FPGA resources.

Example systems, methods, articles of manufacture and apparatus to improve resource utilization for binary tree structures is disclosed herein. Some such examples and combinations thereof include the following.

Example 1 includes an apparatus to improve resource utilization for field programmable gate array (FPGA) resources, the apparatus comprising a computation determiner to identify a computation capability value associated with the FPGA resources, a k-ary tree builder to build a first k-ary tree having a number of k-ary nodes equal to the computation capability value, and an FPGA memory controller to initiate collision computation by transferring the first k-ary tree to a first memory of the FPGA resources.

Example 2 includes the apparatus as defined in example 1, further including a source binary bounding volume hierarchy (BVH) tree retriever to retrieve binary BVH trees, respective ones of the binary BVH trees including BVH nodes having spatial information associated with a surface.

Example 3 includes the apparatus as defined in example 1, further including a queue manager to traverse a first layer of a binary bounding volume hierarchy (BVH) tree to identify a number of descendant BVH nodes.

Example 4 includes the apparatus as defined in example 3, further including a node evaluator to determine whether the number of descendant BVH nodes is equal to the computational capability value.

Example 5 includes the apparatus as defined in example 4, wherein the queue manager is to designate the number of descendant BVH nodes as intermediate nodes when the number of descendant BVH nodes is not equal to the computation capability value and the number of descendant BVH nodes are not leaves Example 6 includes the apparatus as defined in example 4, wherein the queue manager is to prevent processing by the FPGA resources of the number of descendant BVH nodes when the number of descendant BVH nodes is not equal to the computation capability value and the number of descendant BVH nodes are not leaves.

Example 7 includes the apparatus as defined in example 4, wherein the k-ary tree builder is to designate the number of descendant BVH nodes as the number of k-ary nodes when the number of descendant BVH nodes is equal to the computation capability value.

Example 8 includes the apparatus as defined in example 3, wherein the queue manager is to traverse a second layer of the BVH tree when the number of descendant BVH nodes associated with the first layer do not equal the computation capability value and the number of descendant BVH nodes are not leaves.

Example 9 includes the apparatus as defined in example 1, wherein the FPGA memory controller is to transfer the first k-ary tree and a second k-ary tree associated with bounding volume hierarchy (BVH) trees prior to causing the first memory of the FPGA resources to send the first and the second k-ary trees to an FPGA on-chip memory.

Example 10 includes the apparatus as defined in example 9, wherein the FPGA memory controller is to instruct the first memory to transfer at least one of the first k-ary tree or the second k-ary tree as a bandwidth burst of k-ary nodes, the bandwidth burst equal to the computation capability value associated with the FPGA resources.

Example 11 is a method to improve resource utilization for field programmable gate array (FPGA) resources, the method comprising identifying a computation capability value associated with the FPGA resources, building a first k-ary tree having a number of k-ary nodes equal to the computation capability value, and an FPGA memory controller to initiate collision computation by transferring the first k-ary tree to a first memory of the FPGA resources.

Example 12 includes the method as defined in example 11, further including retrieving binary BVH trees, respective ones of the binary BVH trees including BVH nodes having spatial information associated with a surface.

Example 13 includes the method as defined in example 11, further including traversing a first layer of a binary bounding volume hierarchy (BVH) tree to identify a number of descendant BVH nodes.

Example 14 includes the method as defined in example 13, further including determining whether the number of descendant BVH nodes is equal to the computational capability value.

Example 15 includes the method as defined in example 13, further including preventing processing of the FPGA resources of the number of descendant BVH nodes when the number of descendant BVH nodes is not equal to the computation capability value and the number of descendant BVH nodes are not leaves.

Example 16 includes the method as defined in example 13, further including designating the number of descendant BVH nodes as the number of k-ary nodes when the number of descendant BVH nodes is equal to the computation capability value.

Example 17 includes the method as defined in example 12, further including traversing the first k-ary tree and a second k-ary tree associated with bounding volume hierarchy (BVH) trees prior to causing the first memory of the FPGA resources to send the first and the second k-ary trees to an FPGA on-chip memory.

Example 18 includes the method as defined in example 17, further including transferring at least one of the first k-ary tree or the second k-ary tree as a bandwidth burst of k-ary nodes, the bandwidth burst equal to the computation capability value associated with the FPGA resources.

Example 19 includes one or more non-transitory machine-readable storage media comprising machine-readable instructions that, when executed, cause one or more processors to, at least identify a computation capability value associated with FPGA resources, build a first k-ary tree having a number of k-ary nodes equal to the computation capability value, and initiate collision computation by transferring the first k-ary tree to a first memory of the FPGA resources.

Example 20 includes the one or more non-transitory machine-readable storage media as defined in example 19, wherein the instructions, when executed, cause the one or more processors to retrieve binary BVH trees, respective ones of the binary BVH trees including BVH nodes having spatial information associated with a surface.

Example 21 includes the one or more non-transitory machine-readable storage media as defined in example 19 wherein the instructions, when executed, cause the one or more processors to traverse a first layer of a binary bounding volume hierarchy (BVH) tree to identify a number of descendant BVH nodes.

Example 22 includes the one or more non-transitory machine-readable storage media as defined in example 21 wherein the instructions, when executed, cause the one or more processors to determine whether the number of descendant BVH nodes is equal to the computational capability value.

Example 23 includes the one or more non-transitory machine-readable storage media as defined in example 21 wherein the instructions, when executed, cause the one or more processors to prevent processing of the FPGA resources of the number of descendant BVH nodes when the number of descendant BVH nodes is not equal to the computation capability value and the number of descendant BVH nodes are not leaves.

Example 24 includes the one or more non-transitory machine-readable storage media as defined in example 21 wherein the instructions, when executed, cause the one or more processors to designate the number of descendant BVH nodes as the number of k-ary nodes when the number of descendant BVH nodes is equal to the computation capability value.

Example 25 includes the one or more non-transitory machine-readable storage media as defined in example 20 wherein the instructions, when executed, cause the one or more processors to traverse the first k-ary tree and a second k-ary tree associated with bounding volume hierarchy (BVH) trees prior to causing the first memory of the FPGA resources to send the first and the second k-ary trees to an FPGA on-chip memory.

Example 26 includes the one or more non-transitory machine-readable storage media as defined in example 25 wherein the instructions, when executed, cause the one or more processors to transfer at least one of the first k-ary tree or the second k-ary tree as a bandwidth burst of k-ary nodes, the bandwidth burst equal to the computation capability value associated with the FPGA resources.

Example 27 is a system to improve resource utilization for field programmable gate array (FPGA) resources, the system comprising means for identifying a computation capability value associated with the FPGA resources, means for building a first k-ary tree having a number of k-ary nodes equal to the computation capability value, and means for initiating collision computation by transferring the first k-ary tree to a first memory of the FPGA resources.

Example 28 includes the system as defined in example 27, further including means for retrieving binary BVH trees, respective ones of the binary BVH trees including BVH nodes having spatial information associated with a surface.

Example 29 includes the system as defined in example 27, further including means for traversing a first layer of a binary bounding volume hierarchy (BVH) tree to identify a number of descendant BVH nodes.

Example 30 includes the system as defined in example 29 further including means for determining whether the number of descendant BVH nodes is equal to the computational capability value.

Example 31 includes the system as defined in example 30, wherein the determining means is to designate the number of descendant BVH nodes as intermediate nodes when the number of descendant BVH nodes is not equal to the computation capability value and the number of descendant BVH nodes are not leaves.

Example 32 includes the system as defined in example 30, wherein the determining means is to prevent processing by the FPGA resources of the number of descendant BVH nodes when the number of descendant BVH nodes is not equal to the computation capability value and the number of descendant BVH nodes are not leaves.

Example 33 includes the system as defined in example 30, wherein the determining means is to designate the number of descendant BVH nodes as the number of k-ary nodes when the number of descendant BVH nodes is equal to the computation capability value.

Example 34 includes the system as defined in example 29, wherein the determining means is to traverse a second layer of the BVH tree when the number of descendant BVH nodes associated with the first layer do not equal the computation capability value and the number of descendant BVH nodes are not leaves.

Example 35 includes the system as defined in example 27, wherein the initiating means is to transfer the first k-ary tree and a second k-ary tree associated with bounding volume hierarchy (BVH) trees prior to causing the first memory of the FPGA resources to send the first and the second k-ary trees to an FPGA on-chip memory.

Example 36 includes the system as defined in example 35, wherein the initiating means is to instruct the first memory to transfer at least one of the first k-ary tree or the second k-ary tree as a bandwidth burst of k-ary nodes, the bandwidth burst equal to the computation capability value associated with the FPGA resources.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to improve resource utilization for field programmable gate array (FPGA) resources, the apparatus comprising:
a source binary bounding volume hierarchy (BVH) tree retriever to retrieve binary BVH trees, respective ones of the binary BVH trees including BVH nodes having spatial information associated with a surface;
a computation determiner to identify a computation capability value associated with the FPGA resources;
a k-ary tree builder to build a first k-ary tree having a number of k-ary nodes equal to the computation capability value; and
an FPGA memory controller to initiate collision computation corresponding to an object by transferring the first k-ary tree to a first memory of the FPGA resources.

2. The apparatus as defined in claim 1, further including a queue manager to traverse a first layer of respective ones of the BVH trees to identify a number of descendant BVH nodes.

3. The apparatus as defined in claim 2, further including a node evaluator to determine whether the number of descendant BVH nodes is equal to the computational capability value.

4. The apparatus as defined in claim 3, wherein the queue manager is to designate the number of descendant BVH nodes as intermediate nodes when the number of descendant BVH nodes is not equal to the computation capability value and the number of descendant BVH nodes are not leaves.

5. The apparatus as defined in claim 3, wherein the queue manager is to prevent processing by the FPGA resources of the number of descendant BVH nodes when the number of descendant BVH nodes is not equal to the computation capability value and the number of descendant BVH nodes are not leaves.

6. The apparatus as defined in claim 3, wherein the k-ary tree builder is to designate the number of descendant BVH nodes as the number of k-ary nodes when the number of descendant BVH nodes is equal to the computation capability value.

7. The apparatus as defined in claim 2, wherein the queue manager is to traverse a second layer of the BVH tree when the number of descendant BVH nodes associated with the first layer do not equal the computation capability value and the number of descendant BVH nodes are not leaves.

8. The apparatus as defined in claim 1, wherein the FPGA memory controller is to transfer the first k-ary tree and a second k-ary tree associated with respective ones of the BVH trees prior to causing the first memory of the FPGA resources to send the first and the second k-ary trees to an FPGA on-chip memory.

9. The apparatus as defined in claim 8, wherein the FPGA memory controller is to instruct the first memory to transfer at least one of the first k-ary tree or the second k-ary tree as a bandwidth burst of k-ary nodes, the bandwidth burst equal to the computation capability value associated with the FPGA resources.

10. A method to improve resource utilization for field programmable gate array (FPGA) resources, the method comprising:
retrieving, by executing an instruction with processor circuitry, binary bounding volume hierarchy (BVH) trees, respective ones of the binary BVH trees including BVH nodes having spatial information associated with a surface,
identifying, by executing an instruction with the processor circuitry, a computation capability value associated with the FPGA resources;
building, by executing an instruction with the processor circuitry, a first k-ary tree having a number of k-ary nodes equal to the computation capability value; and
an FPGA memory controller to initiate, by executing an instruction with the processor circuitry, collision computation corresponding to an object by transferring the first k-ary tree to a first memory of the FPGA resources.

11. The method as defined in claim 10, further including traversing a first layer of respective ones of the BVH trees to identify a number of descendant BVH nodes.

12. The method as defined in claim 11, further including determining whether the number of descendant BVH nodes is equal to the computational capability value.

13. The method as defined in claim 11, further including preventing processing of the FPGA resources of the number of descendant BVH nodes when the number of descendant BVH nodes is not equal to the computation capability value and the number of descendant BVH nodes are not leaves.

14. The method as defined in claim 11, further including designating the number of descendant BVH nodes as the number of k-ary nodes when the number of descendant BVH nodes is equal to the computation capability value.

15. The method as defined in claim 10, further including traversing the first k-ary tree and a second k-ary tree associated with the BVH trees prior to causing the first memory of the FPGA resources to send the first and the second k-ary trees to an FPGA on-chip memory.

16. The method as defined in claim 15, further including transferring at least one of the first k-ary tree or the second k-ary tree as a bandwidth burst of k-ary nodes, the bandwidth burst equal to the computation capability value associated with the FPGA resources.

17. One or more non-transitory machine-readable storage media comprising machine-readable instructions that, when executed, cause one or more processors to, at least:
retrieve binary bounding volume hierarchy (BVH) trees, respective ones of the binary BVH trees including BVH nodes having spatial information associated with a surface;
identify a computation capability value associated with FPGA resources;
build a first k-ary tree having a number of k-ary nodes equal to the computation capability value; and
initiate collision computation corresponding to an object by transferring the first k-ary tree to a first memory of the FPGA resources.

18. The one or more non-transitory machine-readable storage media as defined in claim 17 wherein the instructions, when executed, cause the one or more processors to traverse a first layer of respective ones of the binary BVH trees to identify a number of descendant BVH nodes.

19. The one or more non-transitory machine-readable storage media as defined in claim 18 wherein the instructions, when executed, cause the one or more processors to determine whether the number of descendant BVH nodes is equal to the computational capability value.

20. The one or more non-transitory machine-readable storage media as defined in claim 18 wherein the instructions, when executed, cause the one or more processors to prevent processing of the FPGA resources of the number of descendant BVH nodes when the number of descendant BVH nodes is not equal to the computation capability value and the number of descendant BVH nodes are not leaves.

21. The one or more non-transitory machine-readable storage media as defined in claim 18 wherein the instructions, when executed, cause the one or more processors to designate the number of descendant BVH nodes as the number of k-ary nodes when the number of descendant BVH nodes is equal to the computation capability value.

22. The one or more non-transitory machine-readable storage media as defined in claim 17, wherein the instructions, when executed, cause the one or more processors to traverse the first k-ary tree and a second k-ary tree associated with bounding volume hierarchy the BVH trees prior to causing the first memory of the FPGA resources to send the first and the second k-ary trees to an FPGA on-chip memory.

* * * * *